United States Patent
Kremin et al.

(10) Patent No.: US 9,013,441 B2
(45) Date of Patent: Apr. 21, 2015

(54) SMART SCANNING FOR A CAPACITIVE SENSING ARRAY

(75) Inventors: Victor Kremin, Lviv (UA); Oleksandr Pirogov, Lviv (UA); Andriy Ryshtun, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 396 days.

(21) Appl. No.: 13/035,061

(22) Filed: Feb. 25, 2011

(65) Prior Publication Data
US 2012/0050216 A1     Mar. 1, 2012

Related U.S. Application Data

(60) Provisional application No. 61/376,347, filed on Aug. 24, 2010.

(51) Int. Cl.
*G06F 3/044* (2006.01)
*G06F 3/041* (2006.01)

(52) U.S. Cl.
CPC ............. *G06F 3/044* (2013.01); *G06F 3/0416* (2013.01)

(58) Field of Classification Search
CPC ..... G06F 3/0488; G06F 3/0416; G06F 3/041; G06F 3/044; G06F 3/0412
USPC ................................ 345/174, 173, 175, 176; 178/18.03–18.06
See application file for complete search history.

(56) References Cited

U.S. PATENT DOCUMENTS

| | | | |
|---|---|---|---|
| 7,834,862 B2 | 11/2010 | Liao et al. | |
| 7,952,564 B2 | 5/2011 | Hurst et al. | |
| 7,973,771 B2 | 7/2011 | Geaghan | |
| 7,995,036 B2 | 8/2011 | Perski et al. | |
| 8,031,094 B2 | 10/2011 | Hotelling et al. | |
| 8,054,090 B2 | 11/2011 | Philipp et al. | |
| 2006/0092143 A1 | 5/2006 | Kasai et al. | |
| 2007/0075923 A1 | 4/2007 | Beuker et al. | |
| 2007/0229468 A1* | 10/2007 | Peng et al. | 345/173 |
| 2008/0007534 A1 | 1/2008 | Peng et al. | |
| 2008/0079699 A1 | 4/2008 | Mackey | |
| 2008/0150906 A1 | 6/2008 | Grivna | |

(Continued)

FOREIGN PATENT DOCUMENTS

| | | |
|---|---|---|
| CN | 201285539 | 8/2009 |
| JP | 2000284898 A | 10/2000 |

(Continued)

OTHER PUBLICATIONS

International Search Report for International Application No. PCT/US12/72201 dated Mar. 11, 2013; 2 pages.

(Continued)

*Primary Examiner* — Alexander S Beck
*Assistant Examiner* — Amen Bogale
(74) *Attorney, Agent, or Firm* — Lowenstein Sandler LLP

(57) ABSTRACT

A method and apparatus scan a plurality of scan groups in a capacitive sense array to generate signals corresponding to a mutual capacitance between the electrodes. Each of the plurality of scan groups is formed from a subset of the plurality of electrodes. A processing device identifies a scan group where the generated signal is affected by a presence of a conductive object. The processing device individually scans the subset of the plurality of sense elements in the identified scan group to determine a location of the conductive object.

14 Claims, 10 Drawing Sheets

(56) References Cited

U.S. PATENT DOCUMENTS

| | | | |
|---|---|---|---|
| 2008/0158167 A1* | 7/2008 | Hotelling et al. | 345/173 |
| 2008/0246723 A1 | 10/2008 | Baumbach | |
| 2008/0277171 A1* | 11/2008 | Wright | 178/18.06 |
| 2009/0009483 A1 | 1/2009 | Hotelling et al. | |
| 2009/0058818 A1 | 3/2009 | Chang et al. | |
| 2009/0153152 A1* | 6/2009 | Maharyta et al. | 324/684 |
| 2009/0167724 A1 | 7/2009 | Xuan et al. | |
| 2009/0273579 A1* | 11/2009 | Zachut et al. | 345/174 |
| 2010/0033196 A1 | 2/2010 | Hayakawa et al. | |
| 2010/0060591 A1 | 3/2010 | Yousefpor et al. | |
| 2010/0073341 A1 | 3/2010 | Toyooka et al. | |
| 2010/0079389 A1 | 4/2010 | Liu et al. | |
| 2010/0085324 A1* | 4/2010 | Noguchi et al. | 345/174 |
| 2010/0139991 A1 | 6/2010 | Philipp et al. | |
| 2010/0141605 A1 | 6/2010 | Kang et al. | |
| 2010/0149127 A1 | 6/2010 | Fisher et al. | |
| 2010/0244859 A1 | 9/2010 | Cormier, Jr. et al. | |
| 2010/0295564 A1 | 11/2010 | Reynolds | |
| 2010/0315375 A1* | 12/2010 | Yang | 345/174 |
| 2011/0055305 A1 | 3/2011 | Matsushima | |
| 2011/0063154 A1 | 3/2011 | Hotelling et al. | |
| 2011/0109568 A1 | 5/2011 | Wu et al. | |
| 2011/0163992 A1 | 7/2011 | Cordeiro et al. | |
| 2011/0254802 A1 | 10/2011 | Philipp | |
| 2012/0013565 A1 | 1/2012 | Westhues et al. | |
| 2012/0056841 A1 | 3/2012 | Krenik et al. | |
| 2012/0268142 A1 | 10/2012 | Kremin et al. | |
| 2013/0021294 A1 | 1/2013 | Maharyta et al. | |

FOREIGN PATENT DOCUMENTS

| | | | |
|---|---|---|---|
| JP | 2009289235 A | 12/2009 | |
| KR | 20060132145 A | 12/2006 | |
| WO | 8505477 A | 12/1985 | |

OTHER PUBLICATIONS

USPTO Advisory Action for U.S. Appl. No. 13/629,437 dated Sep. 18, 2013; 3 pages.

USPTO Final Rejection for U.S. Appl. No. 13/629,437 dated Apr. 10, 2013; 17 pages.

USPTO Non Final Rejection for U.S. Appl. No. 13/247,779 dated Oct. 25, 2013; 15 pages.

USPTO Non-Final Rejection for U.S. Appl. No. 13/629,437 dated Dec. 10, 2012; 15 pages.

USPTO Notice of Allowance for U.S. Appl. No. 13/629,437 dated Oct. 29, 2013; 14 pages.

Written Opinion of the International Searching Authority for International Application No. PCT/US12/72201 mailed Mar. 11, 2013; 9 pages.

Fang, W. (Jul. 2007). "Reducing Analog Input Noise in Touch Screen Systems" Texas Instruments Application Report, 12 pages.

International Search Report for International Application No. PCT/IB2011/003284 dated Feb. 4, 2013; 4 pages.

Silicon Labs. "How to minimize touchscreen Electromagnetic Interference." 7 pages.

USPTO Final Rejection for U.S. Appl. No. 13/247,779 dated Nov. 7, 2014; 17 pages.

USPTO Non-Final Rejection for U.S. Appl. No. 13/247,779 dated Jul. 8, 2014; 15 pages.

Written Opinion of the International Searching Authority for International Application No. PCT/IB2011/003284 dated Feb. 4, 2013; 7 pages.

* cited by examiner

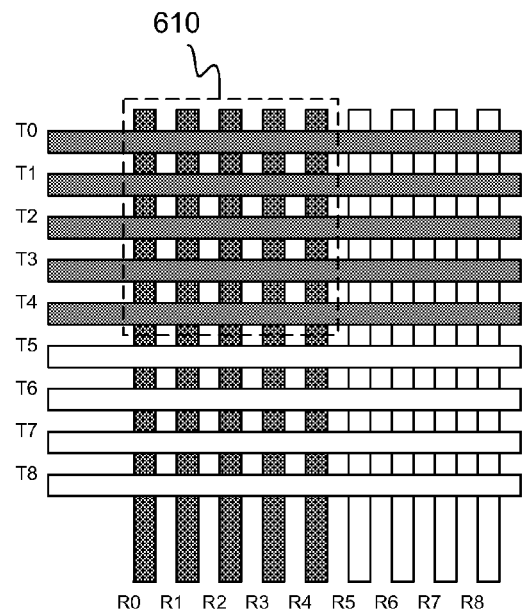 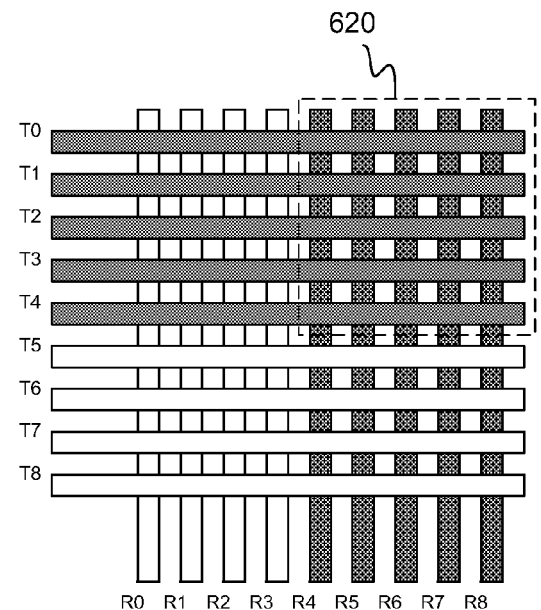
Fig. 6A                                    Fig. 6B
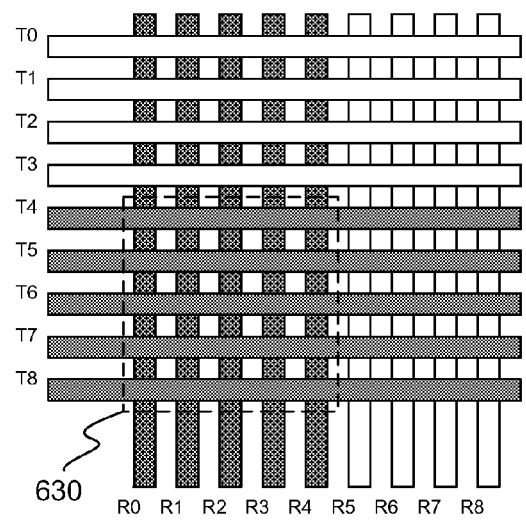 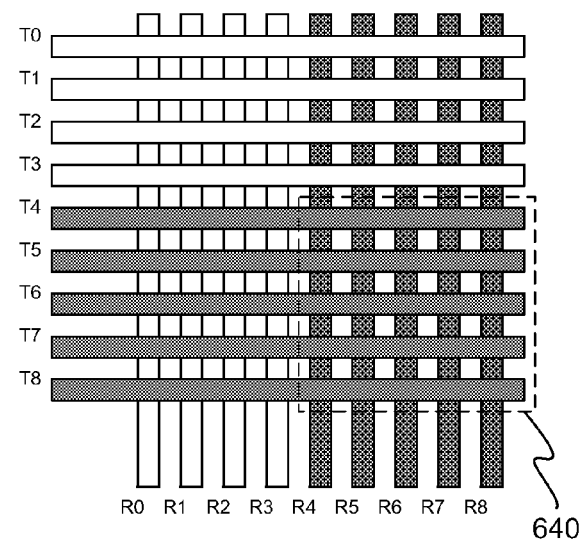
Fig. 6C                                    Fig. 6D

SMART SCANNING FOR A CAPACITIVE SENSING ARRAY

RELATED APPLICATIONS

This application claims the benefit of U.S. Provisional Application No. 61/376,347 filed on Aug. 24, 2010, the contents of which are hereby incorporated by reference herein.

TECHNICAL FIELD

This disclosure relates to the field of touch-sensor devices and, in particular, to smart scanning for a capacitive sense array.

BACKGROUND

Computing devices, such as notebook computers, personal data assistants (PDAs), mobile communication devices, portable entertainment devices (such as handheld video game devices, multimedia players, and the like) and set-top-boxes (such as digital cable boxes, digital video disc (DVD) players, and the like) have user interface devices, which are also known as human interface devices (HID), that facilitate interaction between the user and the computing device. One type of user interface device that has become more common is a touch-sensor device that operates by way of capacitance sensing. A touch-sensor device usually is in the form of a touch-sensor pad, a touch-sensor slider, or touch-sensor buttons, and includes an array of one or more capacitive sense elements. The capacitance detected by a capacitance sensor changes as a function of the proximity of a conductive object to the touch sensor. The conductive object can be, for example, a stylus or a user's finger.

One type of capacitance sensing device includes multiple touch sense electrodes arranged in rows and columns and forming an array of intersections. At each intersection of the electrodes in the X and Y axes (i.e., a location where the approximately orthogonal electrodes cross over, but do not connect with, one another), a mutual capacitance is formed between the electrodes thus forming a matrix of capacitive sense elements. This mutual capacitance is measured by a processing system and a change in capacitance (e.g., due to the proximity or movement of a conductive object) can be detected. In a touch-sensor device, a change in capacitance of each sense element in the X and Y axes of the touch sense array can be measured by a variety of methods. Regardless of the method, usually an electrical signal representative of the capacitance of the capacitive sense elements is measured and processed by a processing device, which in turn produces electrical or optical signals representative of the position of one or more conductive objects in relation to the touch-sensor pad in the X and Y axes. A touch-sensor strip, slider, or button may operate on the same or another capacitance-sensing principle.

The processing system may have a number of receive channels, each of which can receive the electrical signal associated with one or more different sense elements. Certain processing systems may have a limited number of these receive channels, however, which limits the number of measurements that can be performed at a same time. For example, if the processing system has four receive channels, then only four sense elements can be measured in parallel to detect a change in capacitance. For large touch-sensor devices that contain a high number of sense elements in the array, sequentially scanning the elements in these groups of a limited size (e.g., four at a time) may be prohibitively time consuming.

BRIEF DESCRIPTION OF THE DRAWINGS

The present disclosure is illustrated by way of example, and not by way of limitation, in the figures of the accompanying drawings.

FIGS. 6A, 6B, 6C and 6D are block diagrams illustrating overlapping scan groups in a capacitive sense array, according to an embodiment.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of a method and apparatus are described to intelligently scan a capacitive sense array. In one embodiment, a processing system performs a multi-step smart scan of the capacitive sense array. First, a coarse scan is performed to determine an approximate location of a conductive object (e.g., a user's finger). The processing system logically divides the capacitive sense array into a number of scan groups. For example, the sense array may be composed of eight transmit electrodes and sixteen receive electrodes forming an 8×16 matrix with 128 intersections. The processing system may logically divide the receive electrodes into scan groups of four electrodes, which may be logically combined (e.g., using a multiplexer) and provided to a single receive input (e.g., a channel) of the processing system. This coarse scan allows the processing system to determine the general areas where one or more conductive objects may be in contact or close proximity with the capacitive sense array of a touch-sensor device. In one embodiment, the coarse scan may include measuring a capacitance of each scan group and comparing the value of the measured capacitance to a touch threshold value. The processing system may then scan each receive electrode in the scan group and/or neighbor groups where the touch was detected individually (e.g., a fine scan) to more finely determine the location of the conductive object. This smart scan method may accurately detect the presence and determine the location of the conductive object while saving time, power and system resources in comparison to other scanning techniques. The smart scan method may provide increased benefits as the size of the capacitive sense array increases.

Figure 1:
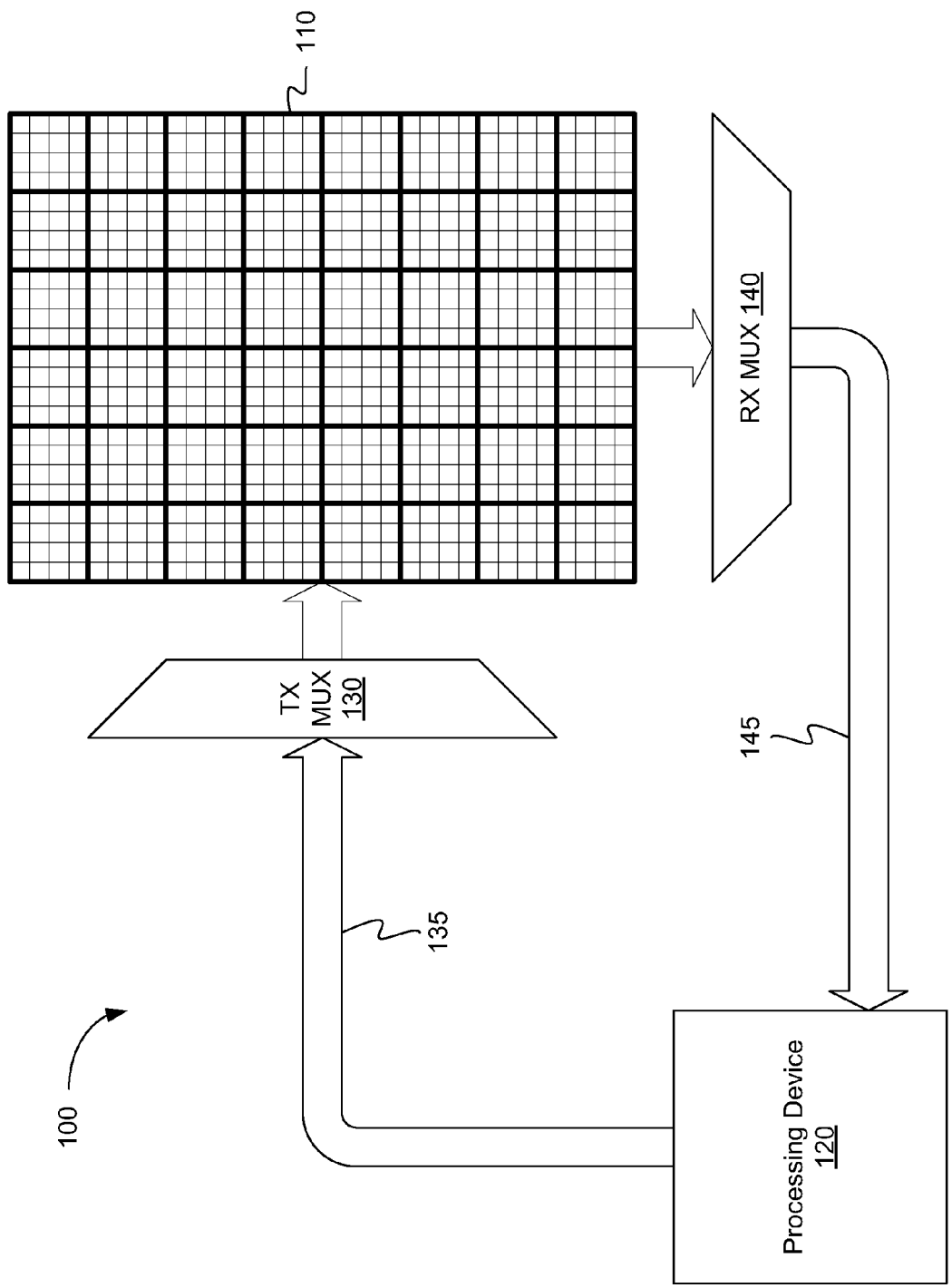
FIG. 1 is a block diagram illustrating a capacitance sensing system, according to an embodiment.

FIG. 1 is a block diagram illustrating a capacitance sensing system 100, according to an embodiment of the present invention. In one embodiment, system 100 includes capacitive sense array 110, processing device 120, and multiplexers 130, 140. Capacitive sense array 110 may be part of, for example, a touch-sensing device, such as a touch-sensor pad, a touch-screen display, a touch-sensor slider, a touch-sensor button, or other device. Capacitive sense array 110 may include a matrix of sense elements arranged in rows and columns (e.g., in the X and Y axes) that can be used to detect the proximity or physical contact of a conductive object (e.g., a user's finger). In one embodiment, processing device 120 uses a mutual capacitance sensing technique to measure capacitive sense array 110, where a mutual capacitance is present where each transmit electrode crosses each receive electrode. The magnitude of change in this mutual capacitance at one or more intersections allows processing device 120 to determine the approximate location of the conductive object.

With mutual capacitance sensing, one set of electrodes (e.g., the rows oriented parallel to the X axis) are designated as transmit (TX) electrodes. The transmit electrodes are driven with an electronic signal 135 provided by processing device 120. In one embodiment, transmit multiplexer (TX MUX) 130 may be used to apply the electronic signal 135 to one or more of the transmit electrodes. Another set of electrodes (e.g., the columns oriented parallel to the Y axis) are designated as receive (RX) electrodes. The mutual capacitance between the driven rows and columns may be measured by sampling a signal on each of the receive electrodes. In one embodiment, receive multiplexer (RX MUX) 140 may be used to couple the signal received on one or more of the receive electrodes and provide the received signal 145 back to processing device 120 for measurement. Transmit multiplexer 130 and receive multiplexer 140 may be used to logically group the electrodes in capacitive sense array 110 for use in smart scanning of the array, as will be described further below. The designation of rows and columns as transmit and receive electrodes is merely one example, and in other embodiments, the rows and columns may be reversed. In a further embodiment, the allocation of transmit and receive electrodes may be dynamic in nature, such that for one measurement an electrode may be used as a transmit electrode, and in a following measurement it may be used as a receive electrode.

Figure 2:
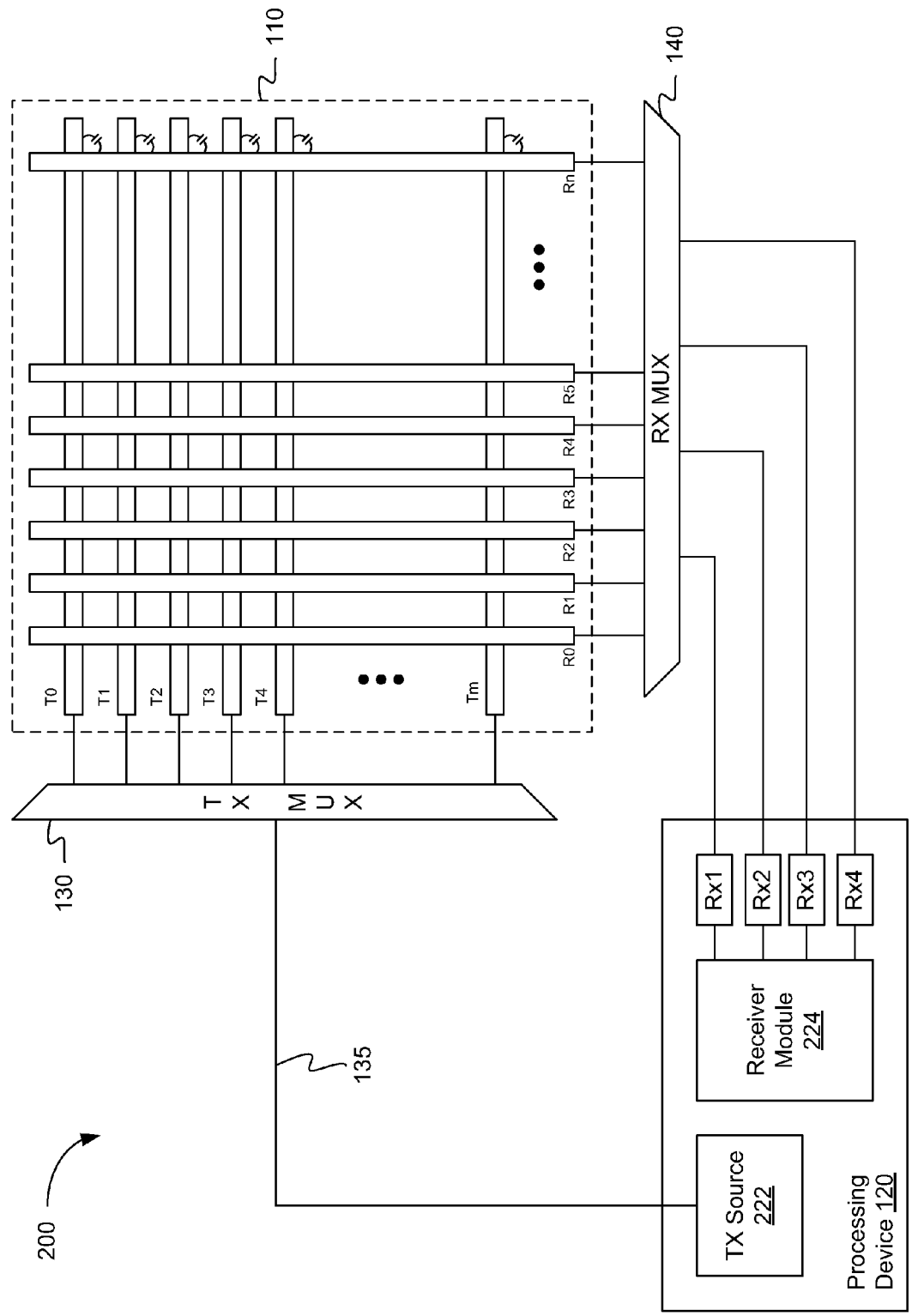
FIG. 2 is a block diagram illustrating a capacitance sensing system, according to an embodiment.

FIG. 2 is a block diagram illustrating a capacitance sensing system 200, according to an embodiment of the present invention. In one embodiment, system 200 includes capacitive sense array 110, processing device 120, and multiplexers 130, 140, as described above with respect to FIG. 1. In capacitive sense array 110, individual transmit electrodes T0-Tm and receive electrodes R0-Rn are shown. In different embodiments, there may be any number of transmit and receive electrodes in capacitive sense array 110.

Each of transmit electrodes T0-Tm may be connected to transmit multiplexer 130, which controls application of transmit signal 135. Transmit multiplexer 130 may selectively apply transmit signal 135 to one or more of transmit electrodes T0-Tm based on a control signal (not shown). The control signal may be received from processing device 120 or from some other source. Transmit multiplexer 130 may apply transmit signal 135 to (i.e., drive) a select number of transmit electrodes at a time (e.g., T0-T3). These transmit electrodes that are driven together may form the X-axis component of a scan group used for smart scanning of capacitive sense array 110. The transmit electrodes may be driven sequentially (i.e., one at a time) with the transmit signal 135, or a select number may be driven at the same time. The number of transmit electrodes driven at one time may also be based on electrical considerations of capacitive sense array 110 and processing device 120, such as the level of charge that receive electrodes R0-Rn can handle, or the maximum charge that the transmit signal 135 may provide. In one embodiment, transmit signal 135 is provided by transmit source component 222 of processing device 120, however in other embodiments, transmit signal 135 may be provided by some other source. In some embodiments, transmit source component 222 may drive multiple transmit electrodes with a transmit signal 135 having multiple phases, frequencies or amplitudes.

Each of receive electrodes R0-Rn may be connected to receive multiplexer 140, which controls the application of receive signals to processing device 120 for measurement and processing. In one embodiment, processing device 120 includes receiver module 224. Receiver module 224 may couple to a number of receive channels Rx1, Rx2, Rx3, Rx4, each of which is configurable to measure and process a receive signal from one or more of receive electrodes R0-Rn. In other embodiments, there may some other number of receive channels. In certain embodiments, however, the number of receive channels may be less than the number of receive electrodes, thus preventing all receive electrodes from being measured at once. Receive multiplexer 140 may selectively apply receive signals from a number of receive electrodes (e.g., R0-R3) to one receive channel (e.g., Rx1) for measurement based on a control signal (not shown). The control signal may be received from processing device 120 or from some other source. These receive electrodes that are measured together may form the Y-axis component of a scan group used for smart scanning of capacitive sense array 110. Thus, if the receive signal from any of receive electrodes R0-R3 indicates the presence of a conductive object, receiver module 224 will detect the presence on receive channel Rx1. In one embodiment, the number of receive electrodes that make up each scan group may be determined by the total number of receive electrodes, divided by the number of receive channels. Thus, if there are twelve receive electrodes, for example, and four receive channels, each scan group may include three receive electrodes. In other embodiments, the scan groups may have some other number of receive electrodes.

Figure 3A:
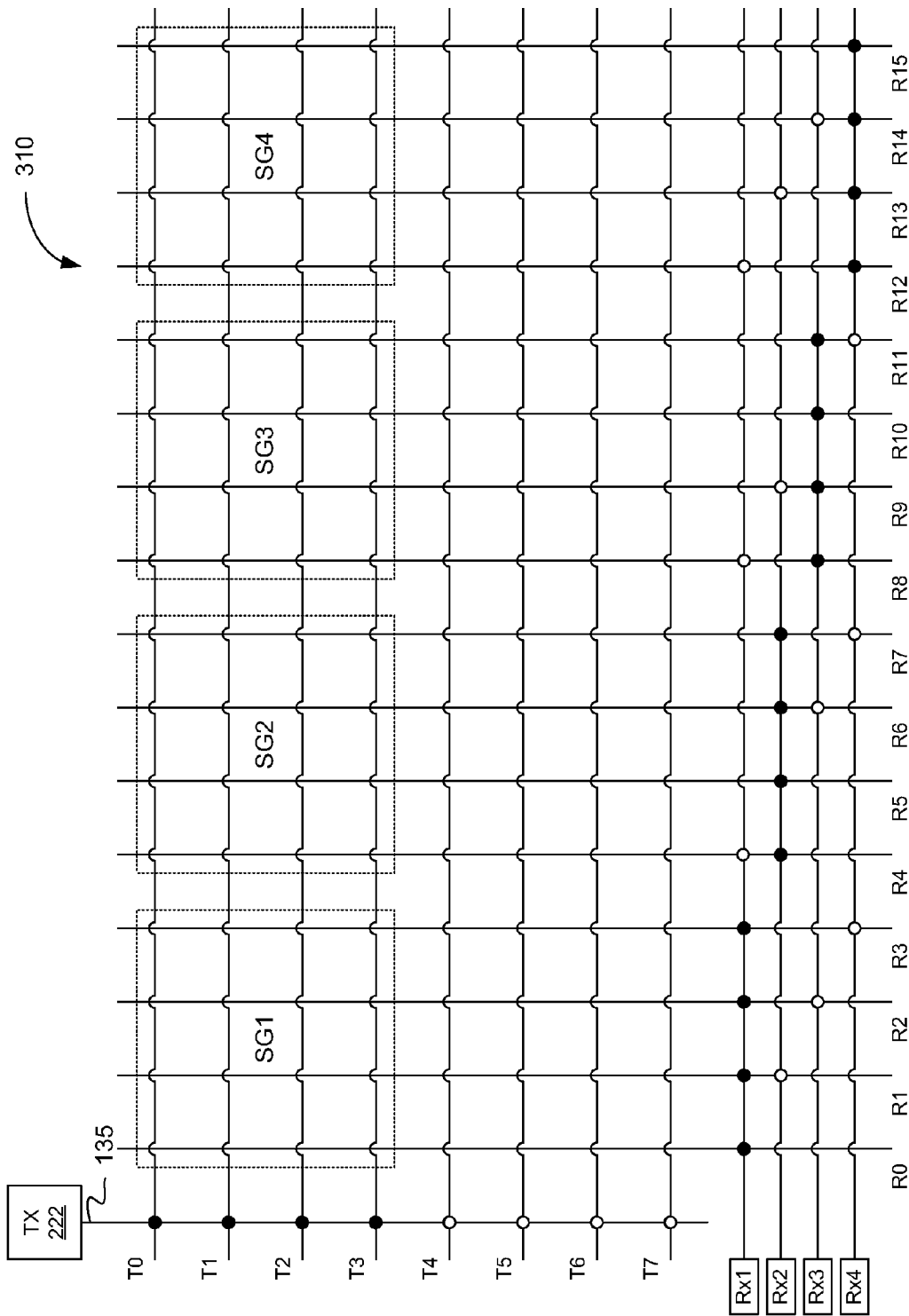
FIGS. 3A and 3B are schematic diagrams illustrating a capacitive sense array structure, according to an embodiment.

FIG. 3A is a schematic diagram illustrating a capacitive sense array structure, according to an embodiment of the present invention. In one embodiment capacitive sense array structure 310 may be an example of capacitive sense array 110 and multiplexers 130, 140 shown in FIGS. 1 and 2. In this embodiment capacitive sense array structure 310 includes transmit electrodes T0-T7 and receive electrodes R0-R15. For purposes of discussion, smart scanning of capacitive sense array structure 310 will be described in reference to a sensing system 200 having four receive channels Rx1, Rx2, Rx3, Rx4, as discussed above with respect to FIG. 2.

A transmit signal (e.g., transmit signal 135) is provided by transmit driver TX (e.g., TX source 222), and may be selectively applied to each of transmit electrodes T0-T7. The transmit signal may be applied to a transmit electrode when a corresponding switch is activated (represented in FIG. 3A by a black dot). There may be individual switches for each transmit electrode or the switches may be embodied within transmit multiplexer 130. During a first portion of a coarse scan of capacitive sense array structure 310, the transmit signal may be applied to transmit electrodes T0-T3. The receive electrodes may be grouped together to sample the measured receive signal on the different receive channels. Each receive channel Rx1, Rx2, Rx3, Rx4, may have a similar switching structure (where a black dot represents an active or closed switch, and a white dot represents an open switch), which may be embodied in receive multiplexer 140. In this example, receive channel Rx1 is used to measure a signal on receive electrodes R0-R3, receive channel Rx2 is used to measure a signal on receive electrodes R4-R7, receive channel Rx3 is used to measure a signal on receive electrodes R8-R11, and receive channel Rx4 is used to measure a signal on receive electrodes R12-R15.

The capacitive sense elements formed at the intersections of the transmit and receive electrodes may be activated by corresponding switches form a number of scan groups, identified in FIG. 3A as SG1, SG2, SG3, SG4. The presence of a conductive object that affects the mutual capacitance measurement, beyond a touch activation threshold, at any sense element within a scan group will be detected by the processing system. Since each scan group is measured by a single receive channel, the processing system cannot determine the exact location of the conductive object within the scan group at this point. Subsequently, transmit electrodes T4-T7 may be driven with the transmit signal, with transmit electrodes T0-T4 not driven, and the same receive electrodes may be coupled to the receive channels forming additional scan groups (not shown). In this manner, the system can determine the presence and approximate location of a conductive object with a limited number of measurements. In one embodiment, where coarse scan groups overlap (e.g., sharing one or more transmit and/or receive electrode), additional measurements may be used depending on the number of receive channels in the system. Since the determination of touch presence within a course scan group is effectively a binary condition (e.g., yes/no or 1/0), such measurements may be performed at a lower precision than those needed for fine scan measurements. In one embodiment, such a yes/no decision may have a minimal signal to noise ratio (SNR) of approximately 5 to 1. In other embodiments, some other SNR target may be used.

Figure 3B:
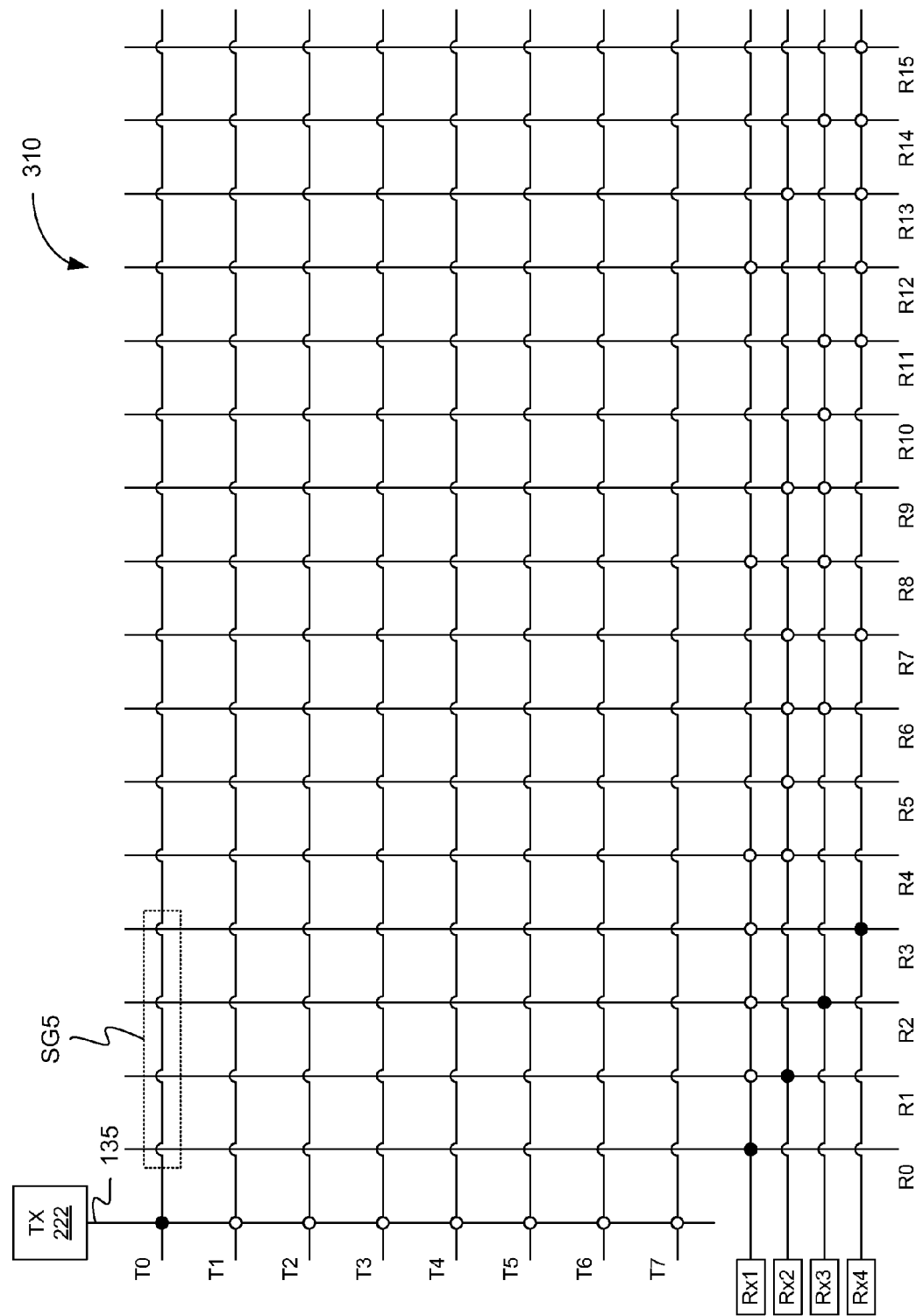

FIG. 3B is a schematic diagram illustrating a capacitive sense array structure 310, according to an embodiment. After the approximate location of a conductive object is detected via the coarse scan described above with respect to FIG. 3A, a fine scan may be used to determine a more precise location of the conductive object. For purposes of this description it is assumed that a conductive object presence was detected within scan group SG1, as shown in FIG. 3A. This means that at least one of the sense elements formed at the intersections of transmit electrodes T0-T3 and receive electrodes R0-R3 had a change in the measured mutual capacitance, above a configured touch present threshold, which can likely be attributable to the presence of a conductive object. For the fine scan, each transmit electrode in the scan group SG1 is driven individually, starting for example with transmit electrode T0. In this embodiment, receive channels Rx1, Rx2, Rx3, Rx4 are coupled to receive electrodes R0-R3, respectively. The intersections between these electrodes form a fine scan group SG5. In subsequent scan cycles, each transmit electrode in scan group SG1 is driven, with corresponding measurements taken on receive electrodes R0-R3. This allows a more precise location of the conductive object to be determined. A similar fine scan may be performed for any of the coarse scan groups where the presence of a conductive object was detected during the coarse scan described above. When fine scanning, (i.e., when the relative magnitudes of touch on adjacent sense elements are used to calculate a centroid of a touch position at a granularity much less than the pitch of the electrodes), measurements may be made to a higher SNR than those for a simple yes/no decision. Measuring to such a higher SNR may have a longer measurement time to filter out noise present in the sensing environment. The higher SNR requirements may exist as a result from the methods used for calculating the accurate touch coordinate by applying interpolation techniques, where the touch coordinate is calculated with significantly increased resolution than the electrode pitch. Because proper calculation of the location of the finger or touch is based on the change in capacitance of adjacent sense elements, the system may perform a fine scan of sense elements outside of, yet bordering, a coarse scan group reporting presence (i.e., activation) of a touch. For example, a touch placed near the intersection of electrodes T1 and R3 may be detected by a course scan of block SG1. This touch generates much weaker fringe fields that would also impact the sense elements at the T1/R2, T0/R3, T2/R3, and T1/R4 intersections, and whose relative capacitance values may be used to properly calculate the center of touch. Since the fringing field impacting the sense element at the T1/R4 intersection is much weaker than that at the center of touch, it may not be of sufficient magnitude to indicate touch presence within coarse scan group SG2. Thus, in those conditions where the fine scan results indicate that the touch may be located near a boundary with another coarse scan group, the system may also perform a fine scan measurement of those nearby sense elements to allow calculation of the touch position with all relevant data.

Figure 4A:
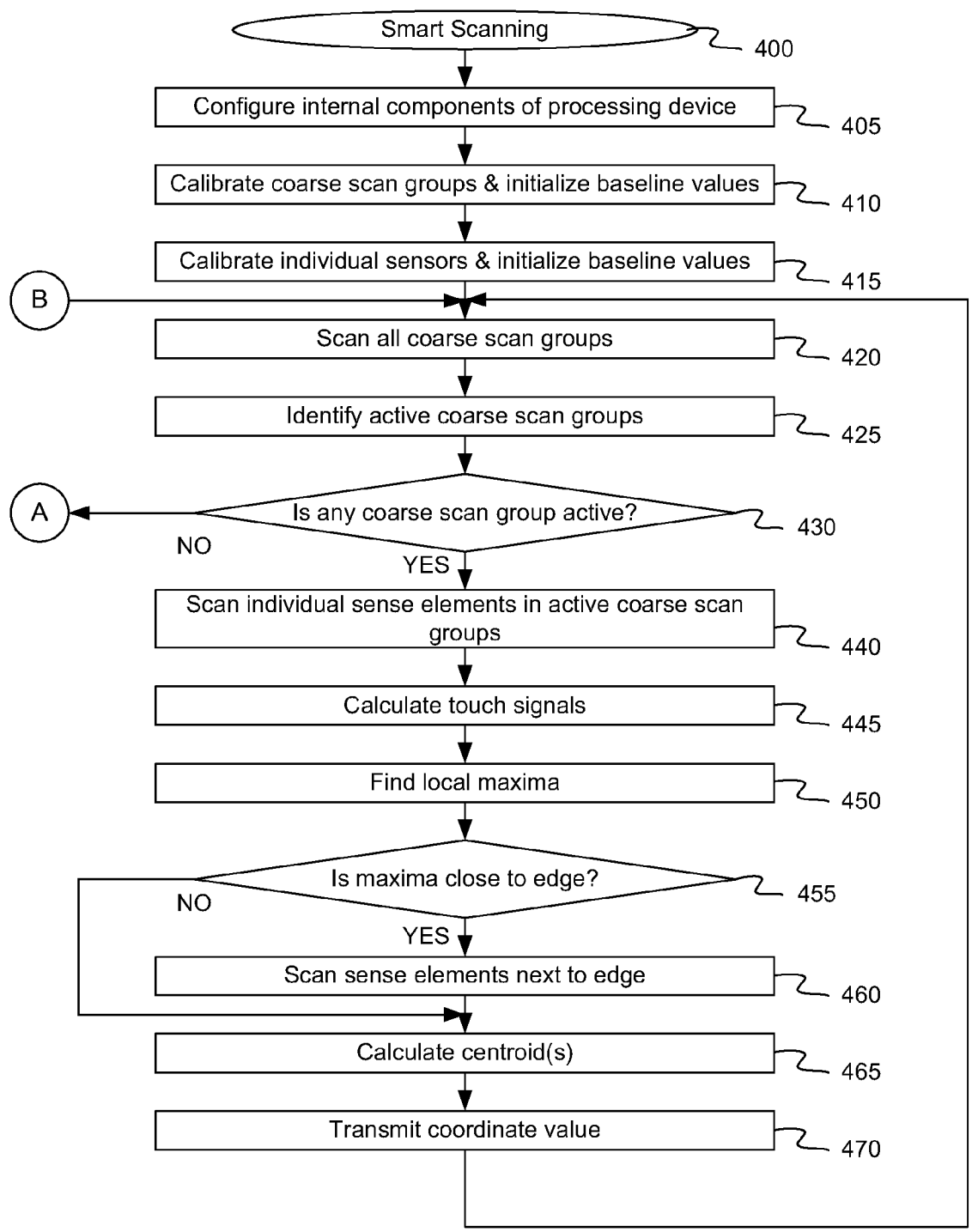
FIGS. 4A and 4B are flow diagrams illustrating a smart scanning method for a capacitive sense array, according to an embodiment.
Figure 4B:
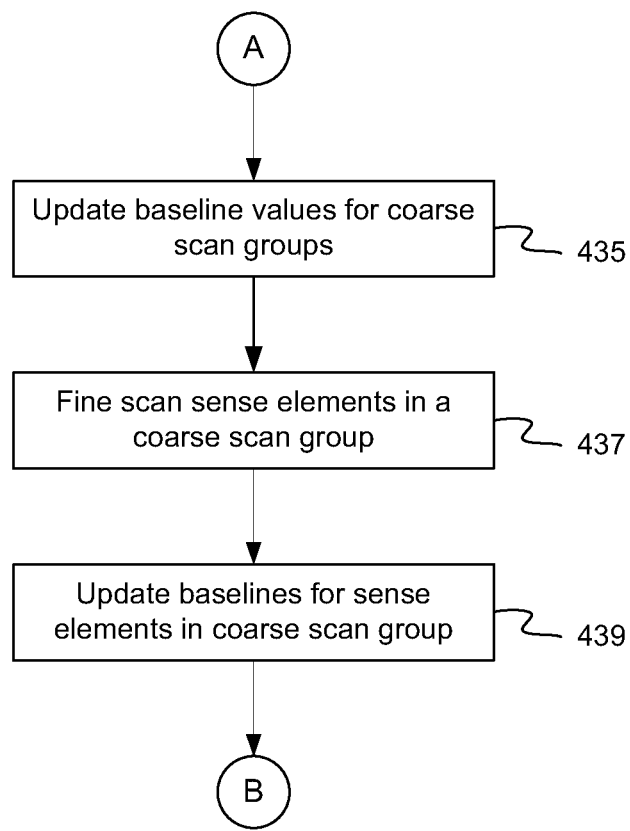

FIGS. 4A and 4B are flow diagrams illustrating a smart scanning method for a capacitive sense array, according to an embodiment. The method 400 may be performed by processing logic that comprises hardware (e.g., circuitry, dedicated logic, programmable logic, microcode), software (e.g., instructions run on a processing device to perform hardware simulation), or a combination thereof. The processing logic is configured to detect the presence of a conductive object on or near a capacitive sense array using coarse and fine scan techniques. In one embodiment, method 400 may be performed by processing device 120 and multiplexers 130, 140, as shown in FIGS. 1 and 2.

Referring to FIG. 4A, at block 405, method 400 configures the components inside processing device 120. These components may include communication components, power supply components, analog components, transmit source component 222, receiver module 224, and other components. Method 400 may additionally configure other components, such as transmit multiplexer 130, receive multiplexer 140 or other components. At block 410, method 400 calibrates the coarse scan groups and measures them with no touch present and saves this as an initial baseline value for each scan group. Processing device 120 may determine which capacitive sense elements of capacitive sense array 110 will make up each of the coarse scan groups. The number of transmit and receive electrodes used to define each coarse scan group may be chosen arbitrarily or based on system information (e.g., the number of available receive channels). The baseline value for a coarse scan group may be representative of the capacitance of the sense elements formed at all of the intersections of the transmit and receive electrodes in a coarse scan group when no conductive object is present on or near the touch-sensing surface of the device. This baseline value may be stored in memory and compared to a later measured value to determine if there has been a change in the capacitance measured for the group. At block 415, method 400 calibrates the individual sense elements in capacitive sense array 110 and initializes the baseline values for the fine scan groups. The baseline values for each fine scan group may be determined similarly to the coarse scan group baseline values, except that the baseline values are measured for each individual sense element. The initial sense element baseline values may also be stored in memory for later use. The configuration and calibration in blocks 405-415 may be performed initially upon power-up of the processing device 120.

At block 420, method 400 initiates a coarse scan of capacitive sense array 110 by scanning each of the coarse scan groups. Processing device 120 may drive a number of transmit electrodes in parallel and measure the resulting signal on the defined coarse groups of receive electrodes as described above with respect to FIG. 3A. The process may be repeated for each of the coarse scan groups until they all have been measured. The measured values may be stored in memory. At block 425, method 400 identifies any active coarse scan groups in capacitive sense array 110. Processing device 120 may compare the measured value for each coarse scan group to the stored baseline value for that particular scan group to generate a differential value. If the differential value (i.e., the difference between the measured value and the baseline value) is greater than (or equal to) a predefined touch threshold value, then the coarse scan group is identified as active. Processing device 120 may interpret an active coarse scan group as having the presence of a conductive object within the boundaries represented by the active scan group on or near the surface of the touch sense array. The status of each coarse scan group (i.e., active or inactive) may be stored in memory.

At block 430, method 400 determines if any coarse scan groups were identified as active at block 425. If no coarse scan groups were identified as active, at block 435 (as shown in FIG. 4B), method 400 updates the baseline values for all coarse scan groups. In addition to baseline updates for all coarse scan groups, at least one coarse scan group is selected and all sense elements within this selected group are scanned using a fine scan procedure at block 437. Baselines for the individual sense elements within the selected coarse scan group are updated in block 439 and method 400 returns back to block 420 (see FIG. 4A) for a full panel coarse scan. The method of group selection provides different group selection for each cycle (e.g., by fine scanning all coarse scan groups in sequence using a group number counter or other order). The proposed technique keeps baselines updated for all coarse and fine groups without noticeable scanning time penalties. The baseline values are updated as the mutual capacitance may change over time, for example, due to changes in temperature, humidity, or other factors. If at block 430, method 400 determines that at least one coarse scan group was identified as active, method 400 initiates a fine scan of the sense elements within the groups identified as active at block 440.

At block 440, method 400 scans each capacitive sense element in the active scan group. Processing device 120 may sequentially drive each transmit electrode and measure the resulting signal on each receive electrode in the scan group as described above with respect to FIG. 3B. The process may be repeated for each of the coarse scan groups identified as active. Thus all sense elements within the activated coarse scan groups are scanned at block 440. At block 445, method 400 calculates touch signals for the sense elements in the active groups. The location of a touch by a conductive object may be identified from these touch signals. For example, using capacitive sense array structure 310 from FIG. 3B, if transmit electrode T0 is driven and decreased signal is measured on receive electrode R1 by receive channel Rx2 (note that the presence of a touch causes a decrease in the measured mutual capacitance), the processing device 120 can determine the location of the touch based in part on the known location of the capacitive sense element formed at the intersection of electrodes T0 and R1. The determination of whether the capacitance of a sense element in a coarse scan group is modified by a touch or not, is based on comparing the measured signal value for that sense element to a previously stored baseline value.

At block 450, method 400 locates the position of the local maxima within all activated coarse scan groups. A conductive object, such as a finger, may trigger a touch signal on multiple sense elements at once. Some of these signals may deviate more from the baseline value than others. In general, the sense element that experiences the largest deviation (i.e., the maxima) can be identified as being near the center of the conductive object. The local maxima can be identified by comparing the touch signal on each of the sense elements in the active scan group. In some embodiments, due to the spacing of transmit and receive electrodes, it is possible to have more than one maxima present within a coarse scan group.

At block 455, method 400 optionally determines if a local maxima is close to the edge of an active coarse scan group. Processing device 120 may determine the location of the sense element where the local maxima was identified at block 450 and compare it to the known locations of the coarse scan group edges. A predetermined threshold distance (e.g., one sense element) may be determined for the comparison. In another embodiment, rather than making the determination of a maxima near the edge of an active coarse scan group at block 455, method 400 may automatically scan a defined area surrounding the active coarse scan group at block 440, regardless of the location or number of maxima within the active coarse scan group. For example, for a touch sensing system using 4×4 coarse scan groups, the default fine scan area may include, for example, a 6×6 or 8×8 area of capacitive sense elements. This alternate embodiment would bypass the decision at block 455 and secondary scanning at block 460.

Figure 5A:
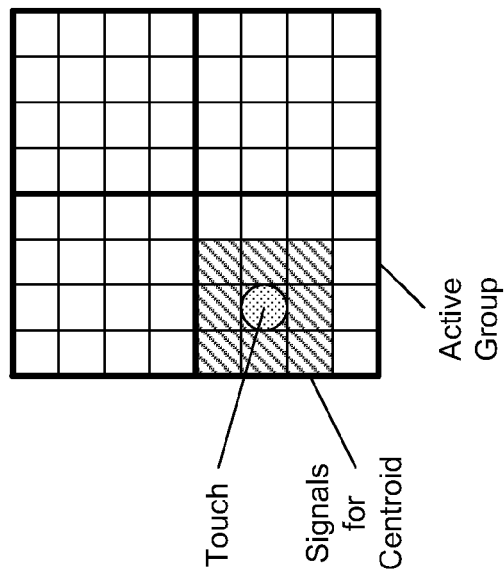
FIGS. 5A, 5B and 5C are block diagrams illustrating the position of a conductive object on a capacitive sense array, according to an embodiment.
Figure 5B:
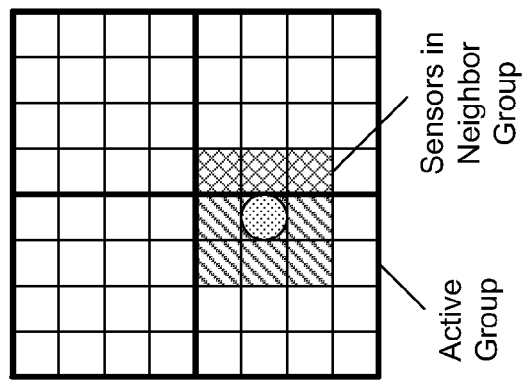
Figure 5C:
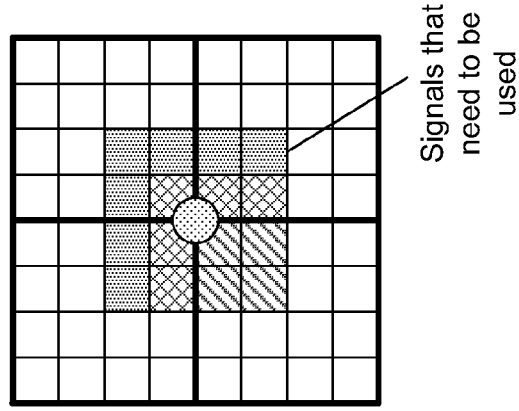

FIGS. 5A, 5B and 5C are block diagrams illustrating the position of a conductive object on a capacitive sense array wherein the thick border around each 4×4 group of sense elements indicates the boundaries of an associated coarse scan group. FIG. 5A shows the position of the touch in the approximate center of an active scan group. In this case, it may not be necessary to scan sense elements in neighboring coarse scan groups. FIG. 5B, shows the position of the touch as being near one edge of an active coarse scan group. In this case, at block 460, method 400 may scan the sense elements in a neighboring coarse scan group which are near the edge of the active coarse scan group. The touch signals from those neighboring sense elements can be used to more accurately identify the local maxima and calculate an associated centroid. FIG. 5C shows the position of the touch as being on the boundary between four different coarse scan groups. In one embodiment, this may cause all four coarse scan groups to be active and each would be fine scanned to determine the precise location of the conductive object. Alternatively, the change in capacitance detected during the coarse scan of each group may be so small so as not to register as a touch (i.e., reach the touch threshold). To remedy this, overlapping scan groups may be used, as described further below. With overlapping scan groups, the system may measure additional sense elements beyond the bounds of the standard coarse scan group. In FIG. 5C, those additional sense elements may include additional rows and columns of sense elements in the neighboring scan groups. Scanning at least two rows and columns in the adjacent groups in this case allows measurement of signals from at least from 3 sense elements to allow accurate touch coordinate calculation. As FIG. 5C shows, with these additional scans the touch would be present in the fine scanned area, providing optimal conditions for accurate touch coordinate calculation.

Referring back to FIG. 4A, at block 465, method 400 calculates a centroid of any touches identified by a local maxima. The calculated centroid may provide a coordinate value that identifies a center of position on the capacitive sense array where the conductive object is located. Every touch corresponds to a maxima, identified within the coarse scan group (and optionally added edge sense elements from adjacent groups). Once the coordinate values are determined, at block 470, method 400 transmits the coordinate values (e.g., to a host computer system or other device) for use in any number of applications. Method 400 returns to block 420 and rescans the coarse scan groups to detect any subsequent touch or movement of existing touches.

FIGS. 6A, 6B, 6C and 6D are block diagrams illustrating overlapping coarse scan groups in a capacitive sense array, according to an embodiment. In one embodiment, rather than each coarse scan group in the capacitive sense array being made up of unique groups of sense elements, adjacent coarse scan groups may share one or more electrodes. For example, in FIG. 6A, coarse scan group 610 includes transmit electrodes T0-T4 and receive electrodes R0-R4. In FIG. 6B, coarse scan group 620 includes transmit electrodes T0-T4 and overlaps scan group 610 by one receive electrode (receive electrode R4), including receive electrodes R4-R8. Similarly in FIGS. 6C and 6D, coarse scan groups 630 and 640 overlap each other (sharing receive electrode R4), as well as each of coarse scan groups 610 and 620 (sharing transmit electrode T4). As shown, scan group 630 includes transmit electrodes T4-T8 and receive electrodes R0-R4 and scan group 640 includes transmit electrodes T4-T8 and receive electrodes R4-R8. In other embodiments, adjacent scan groups may overlap one another may by some other number of electrodes or sense elements.

In a capacitive sense array where scan groups are arranged in an overlapping fashion (for example, as shown in FIGS. 6A-6D), when a coarse scan is performed, the shared sense elements may be measured multiple times. The overlapping arrangement may prevent the need to perform additional edge scanning steps described above for blocks 455 and 460 with respect to FIG. 4A. Thus, if the conductive object is located on a sense element that is shared between two coarse scan groups, both coarse scan groups will be considered active during the coarse scan. Both active coarse scan groups will be subjected to a fine scan, allowing the system to accurately identify the location of the conductive object.

Figure 7A:
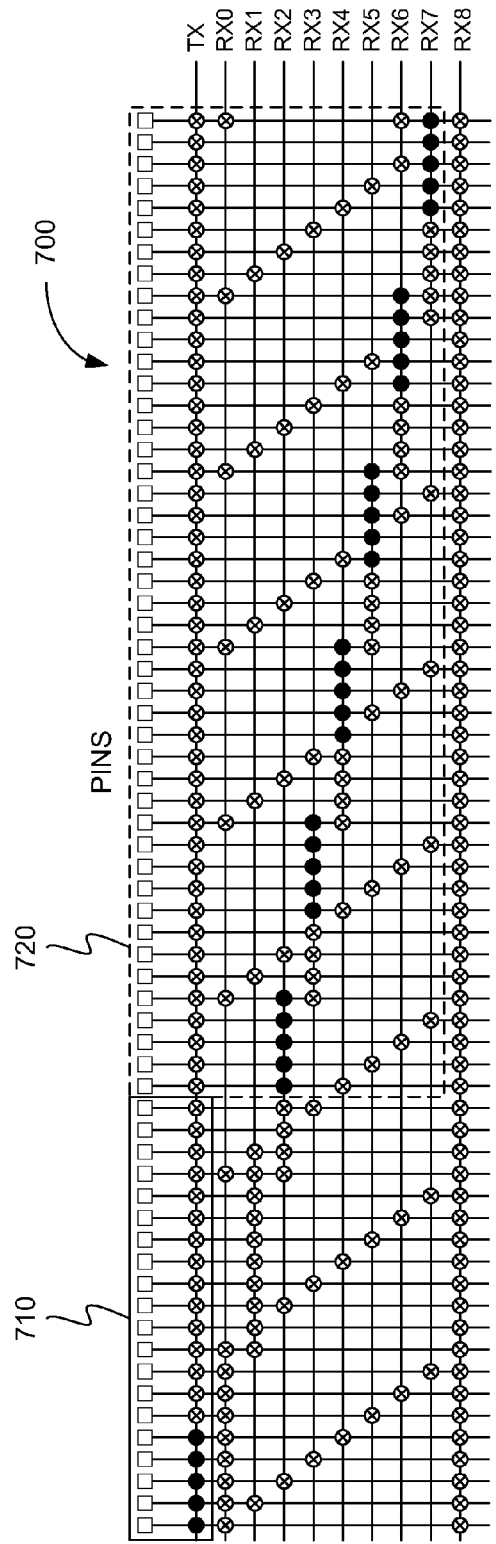
FIGS. 7A and 7B are simplified circuit diagrams illustrating a panel multiplexer for smart scanning, accordingly to an embodiment.
Figure 7B:
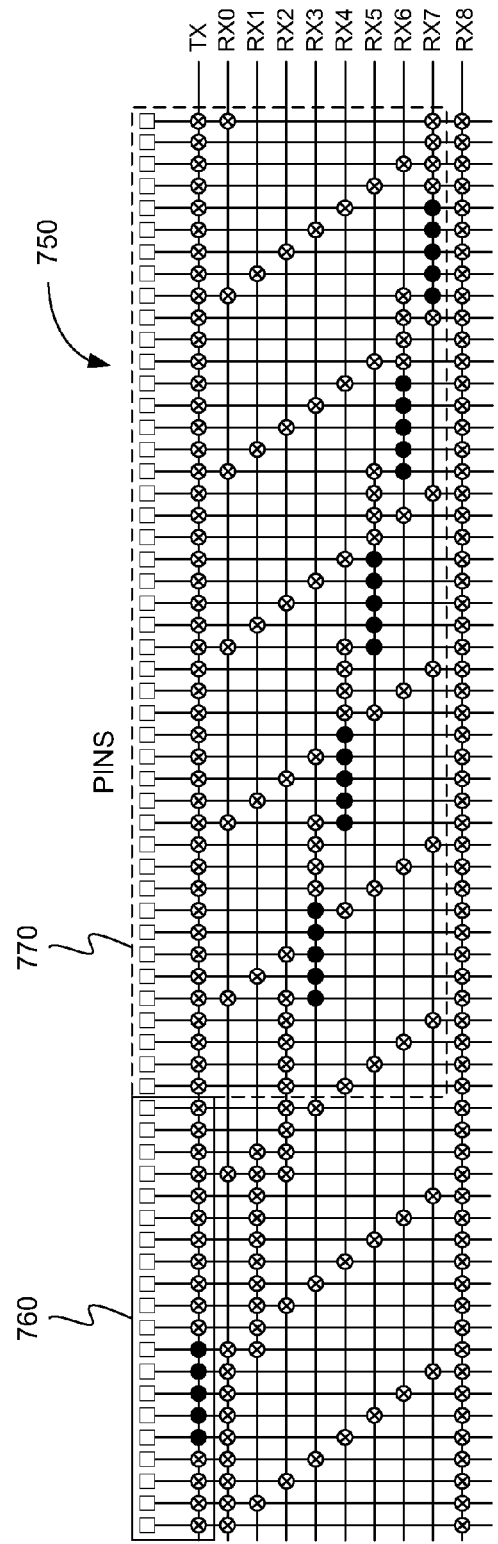

FIGS. 7A and 7B depict an exemplary transmit and receive multiplexer structure optimized for both scanning of overlapped coarse scan groups and fine scanning of all sense elements. As shown, this structure combines the functions of transmit multiplexer 130 and receive multiplexer 140 of FIG. 2 into a single structure, such as might be found in an integrated circuit. The structures 700 and 750 in FIGS. 7A and 7B show one possible multiplexer switch population for the scanning with five receive electrodes in a coarse scan group and one electrode overlap, such as would be used to support the coarse scan groups shown in FIGS. 6A-6D. In the structures 700 and 750, each circle represents one multiplexer switch, and each square represents a pin or signal which may be connected to the transmit and receive electrodes in a capacitive sense array 110. In this exemplary configuration, those pins and switches shown surrounded by a solid rectangle 710, 760 would allow connection of the TX signal 135 to one or more of the individual transmit electrodes T0-Tm, while those pins and switches shown surrounded by a dotted-line rectangle 720, 770 would allow connection of the individual receive electrodes R0-Rn to the receive sense channels RX0-RX7. The multiplexer structure in FIGS. 7A and 7B is designed to work with nine sensing channels, RX0-RX8. The last sensing channel (RX8) may serve the optional function of noise detection or listening, and can be connected to any receive or transmit electrode by design. In FIG. 7A, each black dot indicates a closed multiplexer switch and as configured shows a first mapping of five adjacent receive electrodes coupled to each of receive channels RX2 through RX7. When one or more of the adjacent transmit electrodes are connected to the TX source by closing their respective switches, one or more coarse scan groups are created. When five adjacent electrodes of the TX0-TXm electrodes are connected to the TX source as shown in FIG. 7A, each coarse scan group would span a 5×5 area of intersections. With the transmit and receive multiplexer switches closed as in FIG. 7A the coarse scan group 610 as shown in FIG. 6A could be measured. With the transmit multiplexer switches configured as in FIG. 7A and receive multiplexer switches configured as in FIG. 7B the coarse scan group 620 as shown in FIG. 6B could be measured. With the transmit multiplexer switches configured as in FIG. 7B and receive multiplexer switches configured as in FIG. 7A the coarse scan group 630 as shown in FIG. 6C could be measured. With the transmit and receive multiplexer switches configured as in FIG. 7B the coarse scan group 640 as shown in FIG. 6D could be measured. There are several methods of how to use signals from the overlapped sense elements. In one embodiment, the signals may be averaged before they are processed. When scanning with overlapped coarse scan groups is used, the operation sequence may be very similar to the method 400 of FIG. 4A, except that no additional scanning cycles for the next to edge sense elements are used. Overall, scanning with coarse scan groups having overlapping sense elements gives better linearity when tracking dynamic (i.e., moving) objects than a scheme that scans the sense elements in a neighboring coarse scan group that are near the edge of an active coarse scan group due to the absence of the additional edge scanning cycles. A second advantage of this technique is that a conductive object straddling or moving across coarse scan group boundaries is detected.

Figure 8:
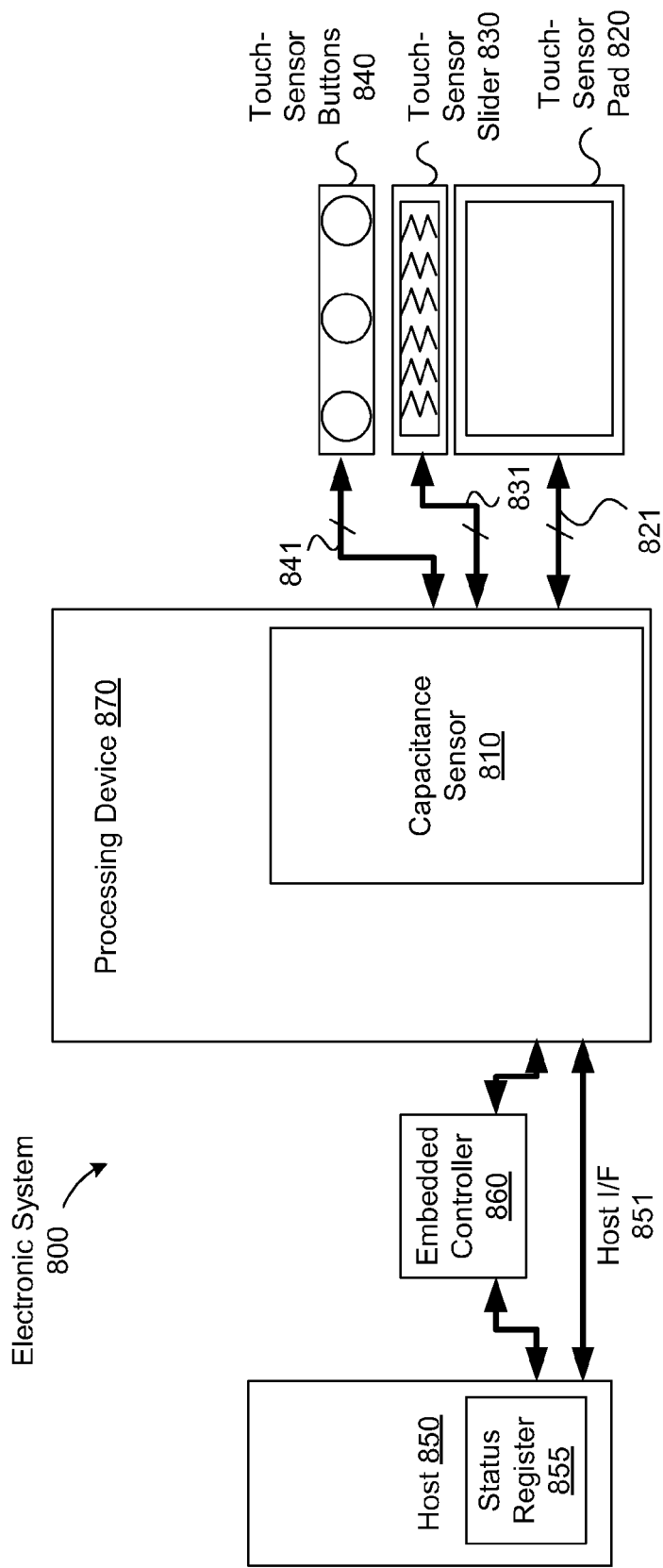
FIG. 8 is a block diagram illustrating an electronic system having a processing device for detecting a presence of a conductive object, according to an embodiment.

FIG. 8 illustrates a block diagram of one embodiment of an electronic system having a processing device for detecting a presence and determining a location of a conductive object. Electronic system 800 includes processing device 870, touch-sensor pad 820, touch-sensor slider 830, touch-sensor buttons 840, host processor 850, and embedded controller 860. As illustrated, capacitance sensor 810 may be integrated into processing device 870. Capacitance sensor 810 may include analog I/O for coupling to an external component, such as touch-sensor pad 820, touch-sensor slider 830, touch-sensor buttons 840, and/or other devices. In one embodiment, processing device 870 may be representative of processing device 120 discussed above and may also include multiplexers 130, 140.

In one embodiment, the electronic system 800 includes touch-sensor pad 820 coupled to the processing device 870 via bus 821. Touch-sensor pad 820 may include one or more electrodes arranged to form a capacitive sense array such as array 110. For the touch-sensor pad 820, the one or more electrodes may be coupled together to detect a presence of a conductive object on or near the surface of the sensing device. In one embodiment, processing device 870 couples signals into and accepts signals from touch-sensor pad 820 representing capacitance sensed by the capacitive sense array via bus 821. In an alternative embodiment, the electronic system 800 includes a touch-sensor slider 830 coupled to the processing device 870 via bus 831. In another embodiment, the electronic system 800 includes a touch-sensor buttons 840 coupled to the processing device 870 via bus 841.

The electronic system 800 may include any combination of one or more of the touch-sensor pad, a touch-sensor screen, a touch-sensor slider, and touch-sensor buttons. In one embodiment, buses 821, 831 and 841 may be a single bus. Alternatively, the bus may be configured into any combination of one or more separate signals or buses.

In one exemplary embodiment, processing device 870 may be a Programmable System on a Chip (PSoC®) processing device, developed by Cypress Semiconductor Corporation, San Jose, Calif. Alternatively, processing device 870 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or the like. In an alternative embodiment, for example, the processing device may be a network processor having multiple processors including a core unit and multiple microengines. Additionally, the processing device may include any combination of general-purpose processing device(s) and special-purpose processing device(s). Processing device 870 may communicate with an external component, such as a host processor 850, via host interface (I/F) line 851. In one embodiment, host processor 850 includes status register 855. In one example, if processing device 870 determines that a conductive object is present on touch-sensor pad 820, processing device 870 sends instructions to update status register 855 to indicate the presence and location of the conductive object. In an alternative embodiment, processing device 870 sends an interrupt request to host processor 850 via interface line 851.

It should also be noted that the embodiments described herein are not limited to having a configuration of a processing device coupled to a host, but may include a system that measures the equivalent capacitance on the sensing device and sends the raw data to a host computer where it is analyzed by an application. In effect the processing that is done by processing device 870 may also be done in the host. In another embodiment, the processing device 870 is the host.

It should be noted that the components of electronic system 800 may include all the components described above. Alternatively, electronic system 800 may include only some of the components described above, or include additional components not listed herein. It should also be noted that any one of various known methods for measuring capacitance may be used, for example relaxation oscillator methods, current versus voltage phase shift measurement, resistor-capacitor charge timing, capacitive bridge divider, charge transfer, successive approximation, sigma-delta modulation, charge-accumulation circuits, field effect, mutual capacitance, frequency shift, or the like.

Embodiments of the present invention include various operations described herein. These operations may be performed by hardware components, software, firmware, or a combination thereof. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

The digital processing devices described herein may include one or more general-purpose processing devices such as a microprocessor or central processing unit, a controller, or the like. Alternatively, the digital processing device may include one or more special-purpose processing devices. In an alternative embodiment, for example, the digital processing device may be a network processor having multiple processors including a core unit and multiple microengines. Additionally, the digital processing device may include any combination of general-purpose processing devices and special-purpose processing devices.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

What is claimed is:

1. A method comprising:
   simultaneously driving a plurality of transmit electrodes in each of a plurality of scan groups in a capacitive sense array to generate a group receive signal for each of the plurality of scan groups corresponding to a mutual capacitance at sense elements of the capacitive sense array that form the scan group, wherein each of the plurality of scan groups comprises a plurality of sense elements;
   determining, based on the group receive signals from the plurality of scan groups, a scan group where the generated receive signal is affected by a presence of a conductive object in proximity to the capacitive sense array, wherein each of a number of receive electrodes that form one of the plurality of scan groups share a single receive processing channel of a plurality of receive processing channels;
   sequentially driving one or more of the plurality of transmit electrodes in an identified scan group with a transmit signal, where the generated receive signal corresponding to the identified scan group is affected by the presence of the conductive object in proximity to the capacitive sense array; and
   determining, based on individual receive signals on each of the receive electrodes that form the identified scan group resulting from the sequential driving, a location of the conductive object, wherein each of the receive electrodes that form the identified scan group are coupled to a separate receive processing channel of the plurality of receive processing channels.

2. The method of claim 1, wherein the number of receive electrodes that form each of the plurality of scan groups is based on a total number of receive electrodes and a number of receive channels in a capacitive sensing device.

3. The method of claim 1, further comprising:
measuring a baseline capacitance value for each of the plurality of scan groups in the capacitive sense array; and
measuring a baseline capacitance value for each of the sense elements in the capacitive sense array.

4. The method of claim 3, wherein identifying a scan group comprises:
comparing a value corresponding to the mutual capacitance for the scan group to the baseline capacitance value for the scan group to determine a differential value; and
determining if the differential value is greater than a touch threshold value.

5. The method of claim 1, wherein a first scan group of the plurality of scan groups overlaps a second adjacent scan group by at least one electrode.

6. An apparatus comprising:
a capacitive sense array having a plurality of sense elements; and
a processing device coupled to the capacitive sense array, the processing device to:
simultaneously drive a plurality of transmit electrodes in each of a plurality of scan groups in the capacitive sense array to generate a group receive signal for each of the plurality of scan groups corresponding to a mutual capacitance at the sense elements that form the scan group, wherein each of the plurality of scan groups comprises a subset of the plurality of sense elements;
determine, based on the group receive signals from the plurality of scan groups, a scan group where the generated receive signal is affected by a presence of a conductive object in proximity to the capacitive sense array, wherein each of a number of receive electrodes that form one of the plurality of scan groups share a single receive processing channel of a plurality of receive processing channels;
sequentially drive one or more of the plurality of transmit electrodes in an identified scan group with a transmit signal, where the generated receive signal corresponding to the identified scan group is affected by the presence of the conductive object in proximity to the capacitive sense array; and
determine, based on individual receive signals on each of the receive electrodes that form the identified scan group resulting from the sequential driving, a location of the conductive object, wherein each of the receive electrodes that form the identified scan group are coupled to a separate receive processing channel of the plurality of receive processing channels.

7. The apparatus of claim 6, wherein the number of receive electrodes that form each of the plurality of scan groups is based on a total number of receive electrodes and a number of receive channels in a capacitive sensing device.

8. The apparatus of claim 6, wherein the processing device is further to:
measure a baseline capacitance value for each of the plurality of scan groups in the capacitive sense array; and
measure a baseline capacitance value for each of the sense elements in the capacitive sense array.

9. The apparatus of claim 8, wherein in order to determine if a conductive object is present, the processing device to:
compare a value corresponding to the mutual capacitance for a scan group to the baseline capacitance value for the scan group to determine a differential value; and
determine if the differential value is greater than a touch threshold value.

10. The apparatus of claim 6, wherein a first scan group of the plurality of scan groups overlaps a second adjacent scan group by at least one electrode.

11. An apparatus comprising:
a touch-sensor device, the touch-sensor device comprising an array of capacitive sense elements, the array comprising a plurality of transmit electrodes and a plurality of receive electrodes;
a transmit selection circuit coupled to the touch-sensor device, the transmit selection circuit to selectively apply a transmit signal to one or more of the transmit electrodes;
a receive selection circuit coupled to the touch-sensor device, the receive selection circuit to selectively measure a signal from one or more of the receive electrodes, wherein the measured signal corresponds to a mutual capacitance value between a transmit electrode and a receive electrode; and
a processing device coupled to the touch-sensor device, the processing device to:
simultaneously drive a plurality of transmit electrodes in a scan group of the capacitive sense array, wherein the scan group comprises the plurality of transmit electrodes and a plurality of receive electrodes;
determine, based on a group receive signal from the scan group, if a conductive object is present on the touch-sensor device in an area corresponding to the scan group, wherein each of the plurality of receive electrodes that form the scan group share a single receive processing channel of a plurality of receive processing channels;
if a conductive object is present on the touch-sensor device in the area corresponding to the scan group, sequentially drive one or more of the plurality of transmit electrodes in the scan group with a transmit signal; and
determine, based on individual receive signals on each of the receive electrodes that form the scan group resulting from the sequential driving, a location of the conductive object, wherein each of the receive electrodes that form the identified scan group are coupled to a separate receive processing channel of the plurality of receive processing channels.

12. The apparatus of claim 11, wherein the number of receive electrodes that form each of the plurality of scan groups is based on a total number of receive electrodes and a number of receive channels in a capacitive sensing device.

13. The apparatus of claim 11, wherein when the processing device determines the location of the conductive object, the processing device to:
determine a coordinate value corresponding to the location of the conductive object; and
provide the coordinate value to a host machine.

14. The apparatus of claim 11, wherein the capacitive sense array comprises a plurality of scan groups and wherein a first scan group of the plurality of scan groups overlaps a second adjacent scan group by at least one sense element.

* * * * *